United States Patent
Livanos

(10) Patent No.: US 8,498,651 B2
(45) Date of Patent: Jul. 30, 2013

(54) METHOD OF CALL ADMISSION CONTROL FOR HOME FEMTOCELLS

(75) Inventor: Konstantin Livanos, Naperville, IL (US)

(73) Assignee: Alcatel Lucent, Paris (FR)

( * ) Notice: Subject to any disclaimer, the term of this patent is extended or adjusted under 35 U.S.C. 154(b) by 471 days.

(21) Appl. No.: 12/613,578

(22) Filed: Nov. 6, 2009

(65) Prior Publication Data

US 2011/0111767 A1    May 12, 2011

(51) Int. Cl.
H04W 72/00    (2009.01)
H04W 4/00    (2009.01)
H04L 12/28    (2006.01)
H04L 12/56    (2006.01)

(52) U.S. Cl.
USPC ..... 455/452.2; 455/450; 455/451; 455/452.1; 455/453; 455/454; 370/338; 370/401; 370/254

(58) Field of Classification Search
USPC .............. 455/452.2, 452.1, 450, 451, 453, 455/454; 370/338, 401, 254
See application file for complete search history.

(56) References Cited

U.S. PATENT DOCUMENTS

| | | | |
|---|---|---|---|
| 2004/0110507 A1 | 6/2004 | Ramakrishnan | 455/445 |
| 2007/0201366 A1* | 8/2007 | Liu | 370/235 |
| 2007/0297430 A1* | 12/2007 | Nykanen et al. | 370/408 |
| 2009/0109922 A1 | 4/2009 | Livanos | 370/331 |
| 2009/0170524 A1* | 7/2009 | Yoshizawa | 455/453 |
| 2009/0191845 A1 | 7/2009 | Morgan | 455/411 |
| 2010/0130171 A1* | 5/2010 | Palanigounder et al. | 455/411 |
| 2011/0039566 A1* | 2/2011 | Zee et al. | 455/450 |

FOREIGN PATENT DOCUMENTS

EP    2 076 076 A1    7/2009
WO    WO 2009/029009    3/2009

OTHER PUBLICATIONS

International PCT Search Report PCT/US2010/053470 dated Jan. 18, 2011.
Written Opinion dated Jan. 18, 2011.

* cited by examiner

Primary Examiner — Christopher M Brandt
Assistant Examiner — Muthuswamy Manoharan
(74) Attorney, Agent, or Firm — Williams, Morgan & Amerson

(57) ABSTRACT

The present invention provides a call admission control method for use in a wireless communication network that includes a femtocell that is coupled to the wireless communication network via a wireline communication network. The method includes receiving, at a call admission controller in the wireless communication network, a request to initiate a call between user equipment and the femtocell. The method also includes accessing, at the call admission controller, information indicating resources available in the wireline communication network to provide a wired connection between the femtocell and the wireless communication network. The method further includes determining, at the call admission controller, whether to admit the call based on the information indicating the resources available in the wireline communication network.

20 Claims, 7 Drawing Sheets

METHOD OF CALL ADMISSION CONTROL FOR HOME FEMTOCELLS

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as a Radio Network Controller (RNC). The RNC may then transmit paging messages to the target mobile unit via one or more base stations or node-Bs. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

A conventional base station provides wireless connectivity within a geographical region that is referred to as a cell, a macrocell, and/or a sector. Conventional base stations can transmit signals using a predetermined amount of available transmission power, which in some cases is approximately 35 W for a base station. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 10 km in a sparsely populated rural environment. The coverage area can also vary in time if any of these parameters changes.

One alternative to the conventional hierarchical network architecture is a distributed architecture including a network of access points, such as base station routers, that implement distributed communication network functionality. For example, each base station router may combine RNC and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the separate RNC and PDSN entities in hierarchical networks may be reduced or removed.

At least in part because of the reduced cost and complexity of deploying a base station router, base station routers may be deployed in locations that are impractical for conventional base stations. For example, a base station router may be deployed in a residence or building to provide wireless connectivity to the occupants of the residents of the building. Base station routers deployed in a residence are typically referred to as home base station routers or femtocells because they are intended to provide wireless connectivity to a much smaller area (e.g., a femtocell) that encompasses a residence. Femtocells have a much smaller power output than conventional base stations that are used to provide coverage to macrocells. For example, a typical femtocell has a transmission power on the order of 10 mW. Consequently, the range of a typical femtocell is much smaller than the range of a macrocell. For example, a typical range of a femtocell is about 100 m. Clusters of femtocells may also be deployed to provide coverage to larger areas and/or to more users.

The functionality in a femtocell is typically quite similar to the functionality implemented in a conventional base station router that is intended to provide wireless connectivity to a macro-cell that may cover an area of approximately a few square kilometers. A femtocell may therefore be deployed by a service provider as an integral and trusted part of a wireless network, in which case the femtocell basically operates as a base station router with a relatively small range. However, femtocells may alternatively be designed to be inexpensive plug-and-play devices that can be purchased off-the-shelf and easily installed by a lay person. This type of femtocell, which is often referred to as a home femtocell or a home node-B, is not considered an integral or trusted part of the wireless network because it is not deployed or controlled by the service provider and is therefore vulnerable to hacking and other unauthorized uses.

Home femtocells are typically connected to the outside network using the user's existing home network infrastructure, such as a cable modem or a DSL connection. A wireless service provider may therefore provide wireless connectivity to subscribers connected to the home femtocells over an air interface that implements 3G and/or 4G wireless access technologies. The wired or wireline home network infrastructure that provides the backhaul network that connects the femtocell to the wireless network. The home network infrastructure can be supported by the same service provider that provides wireless connectivity via the home femtocell or by a different service provider. For example, in some states Verizon operates both a wired network and a wireless network, whereas in other states Verizon only operates a wireless network and contracts or negotiates with other service providers to supply the wired network infrastructure.

When a mobile unit or user equipment (UE) connects to the femtocell, a policy server in the wireless network receives a request for service and decides whether to admit the new request. The admission decision is to be made based on a quality-of-service (QoS) profile associated with the subscriber and the new service flow is admitted only when the radio access network has sufficient available radio resources to support the requested quality-of-service. Wireline service providers also provide a variety of mechanisms to ensure QoS in the wireline access network such as fixed allocation of resources to a fixed line port, IETF defined DiffServ, DSCP marking, Ethernet TOS and TISPAN or ITU T defined policy and charging controls that support dynamic QoS. However the wireless network is not aware of the availability of resources in the wired backhaul network. For example, current 3GPP standards and/or protocols do not differentiate between femtocells that are deployed by a service provider as conventional (trusted and secure) base station routers and femtocells that are deployed by individual as (mistrusted and insecure) home femtocells. Conventional wireless communication systems may therefore manage all femtocells as if they are deployed by a service provider as conventional (trusted and secure) base station routers. Consequently, there is no coordination between the wireless and wireline networks for the admission of/resource allocation for new and/or modified femtocell flows.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a call admission control method is provided for use in a wireless communication network that includes a femtocell that is coupled to the wireless communication network via a wireline communication network. The method includes receiving, at a call admission controller in the wireless communication network, a request to initiate a call between user equipment and the femtocell. The method also includes accessing, at the call admission controller, information indicating resources available in the wireline communication network to provide a wired connection between the femtocell and the wireless communication network. The method further includes determining, at the call admission controller, whether to admit the call based on the information indicating the resources available in the wireline communication network.

In another embodiment, a call admission control method is provided for use in a wireless communication network that includes a femtocell that is coupled to the wireless communication network via a wireline communication network. The method includes receiving, at a call admission controller in the wireline communication network and from a call admission controller in the wireless communication network, a request to allocate resources of the wireline communication network to a call between user equipment and the femtocell. The method also includes determining, at the call admission controller in the wireline communication network, whether the requested resources are available to provide a wired connection between the femtocell and the wireless communication network. The method further includes transmitting, from the call admission controller in the wireline communication network to the call admission control in the wireless communication network, information indicating whether the requested resources are available in the wireline communication network.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
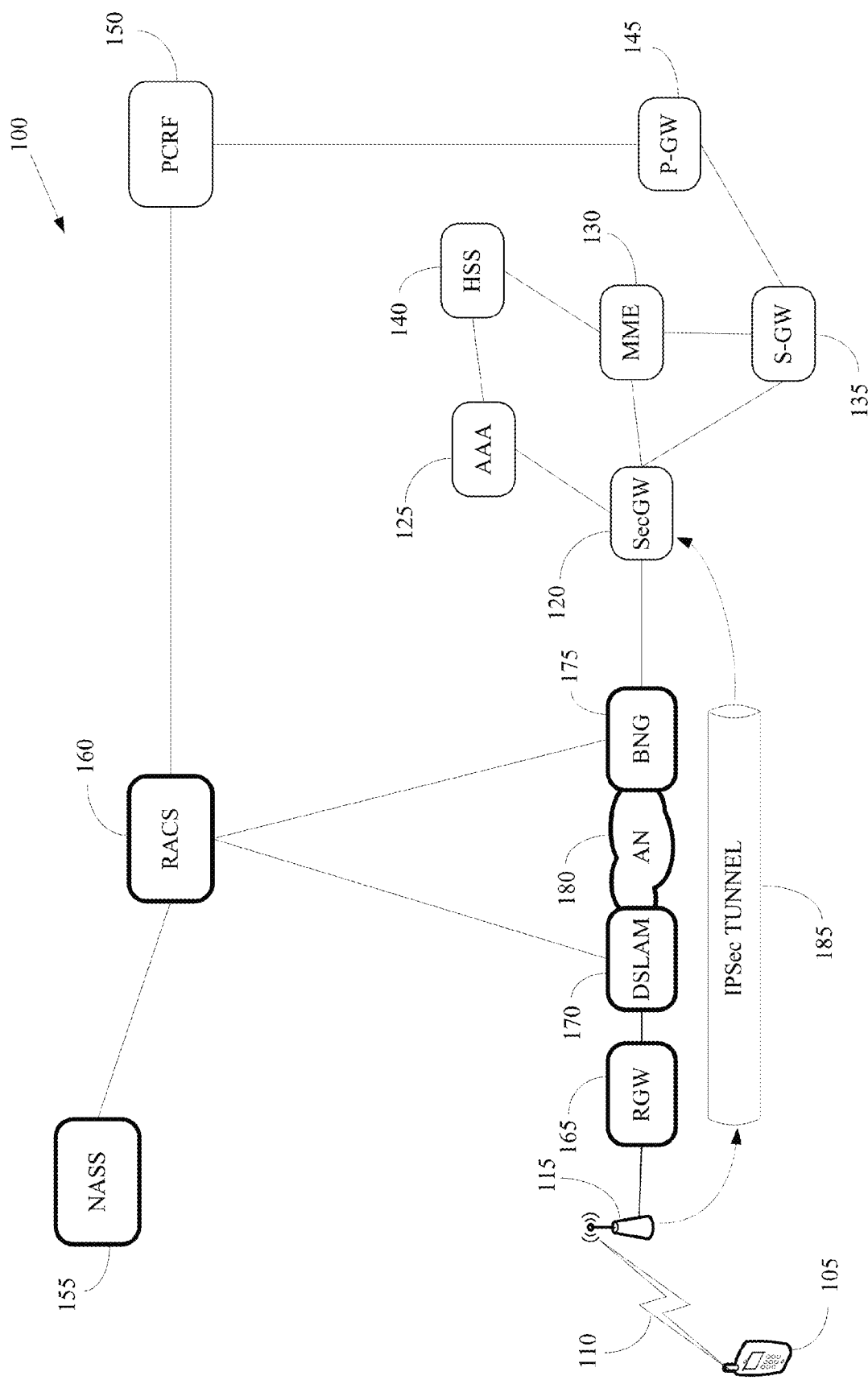
FIG. 1 conceptually illustrates a first exemplary embodiment of a communication system that includes a wireless communication network and a wireline communication network.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a communication system 100 that includes a wireless communication network and a wireline communication network. The entities associated with the wireless communication network shown in FIG. 1 are indicated by relatively thin outlines and the entities associated with the wireline communication network shown in FIG. 1 are indicated by boldfaced outlines. However, persons of ordinary skill in the art having benefit of the present disclosure should appreciate that the wireless indication network and/or the wireline communication network may include additional entities that are not depicted in FIG. 1 to avoid obscuring discussion of the techniques and/or concepts that are relevant to the claimed subject matter.

As used herein, the term "wireless communication network" will be used to refer to entities that are used to provide wireless connectivity to one or more mobile units 105 over corresponding air interfaces 110. Thus, persons of ordinary skill in the art having benefit of the present disclosure should appreciate that a wireless communication network may include entities that communicate over wires as well as entities that communicate over wireless air interfaces. As used herein, the term "wireline communication network" will be used to refer to entities that are used to support communication over wired connections. Persons of ordinary skill in the art having benefit of the present disclosure should appreciate that the standards, protocols, and techniques implemented in wireless communication networks are fundamentally different than the standards, protocols, and techniques implemented in wireline communication networks. The differences arise, at least in part, because of the different requirements for providing wireless connectivity (e.g., over an air interface under variable environmental conditions to mobile units that may move unpredictably within a wide geographic area) and for providing wired connectivity (e.g., to end users that are physically attached to the network and therefore typically occupy a fixed position at a particular node in the network topology).

The wireless communication network includes one or more femtocells 115 that are used to provide wireless connectivity over a relatively small geographic area. In the illustrated embodiment, the femtocell 115 is a home femtocell 115, which may also be referred to as a home e-node-B (HeNB). The femtocell 115 may be a plug-and-play type of device that can be purchased by a user and installed by the user at any desirable location. This type of femtocell 115 is not considered an integral or trusted part of the wireless communication network because it is not deployed or controlled by the service provider and may therefore be vulnerable to hacking and other unauthorized uses.

A security gateway (SecGW) 120 provides the initial gateway from the femtocell 115 into the illustrated embodiment of the wireless communication network. The security gateway 120 is communicatively coupled to an authentication, authorization, and accounting (AAA) server 125, a mobility management entity ((MME) 130, and a serving gateway (S-GW) 135. These entities are also interconnected with a home subscription server ((HSS) 140 and a packet data node gateway (P-GW) 145, which is communicatively coupled to a policy and charging rules function (PCRF) 150. Techniques for implementing and/or operating these entities are known in the art and in the interest of clarity only those aspects of implementing and/or operating these entities that are relevant to the claimed subject matter will be discussed herein. For example, the entities in the wireless communication network may be implemented and are operated according to the standards and/or protocols defined by 3GPP technical specifications such as the Long Term Evolution (LTE) standard and/or protocols.

In an LTE network, the serving gateway 135 routes and forwards user data packets, as well as acting as a mobility anchor for the user plane during handovers. The serving gateway 135 may also terminate the downlink data path for idle users and trigger paging when downlink data arrives for idle users, e.g., from the P-GW 145 that is in communication with a target packet data network (not shown) such as an Internet or an Intranet where an operator provides its own services such as IMS (VoIP), MMS, and the like. The Packet Data Network Gateway 145 may act as an anchor for mobility between various networks, including an LTE network and/or an EvDO network. The home subscriber server (HSS) 140 may implement database functions such as a home location register and security and network access databases. Control plane functions in the network can be implemented in the mobility management entity 130, which may also be responsible for idle mode tracking of mobile units and paging procedures including retransmissions. The mobility management entity 130 may also be involved in the activation/deactivation processes and may select the appropriate serving gateway 135 when users initially attach to the LTE network and/or during handover. User authentication may also be performed by the mobility management entity 130, e.g., by interacting with the home subscriber server 140. Temporary user identities can be assigned by the mobility management entity 130 and the mobility management entity 130 may provide control plane functions for mobility between the LTE network and other networks such as 2G/3G access networks and the EvDO network.

The wireline communication network includes a network access subsystem (NASS) 155 and a resource admission control subsystem (RACS) 160, which is responsible for determining and provisioning admission control policies to other elements of the wireline communication network. Other entities in the wireline communication network include a residential gateway (RGW) 165, a digital subscriber line access multiplexer (DSLAM) 170, and a broadband network gateway (BNG) 175. In the illustrated embodiment, the digital subscriber line access multiplexer 170 communicates with the broadband network gateway 175 over an access network (AN) 180. Techniques for implementing and/or operating these entities are known in the art and in the interest of clarity only those aspects of implementing and/or operating these entities will be discussed herein.

The wireline communication network supports a backhaul communication link between the femtocell 115 and the secure gateway 120. In the illustrated embodiment, the backhaul communication link travels through a secure tunnel 185 that is provided by the residential gateway 165, the DSLAM 170, the access network 180, and the broadband network gateway 175. The secure tunnel 185 is established using communication and/or negotiation between the wireline communication network and the wireless communication network. The secure tunnel 185 can be identified by tunnel information assigned to and/or associated with the secure tunnel 185 when it is established. For example, when the secure tunnel 185 is established according to the IPSec protocol, the secure tunnel 185 may be identified by tunnel information including a globally routable source IP address that identifies the IPSec tunnel 185. The tunnel information can be sent to the AAA server 125 by the secure gateway 120 and then to the home subscription server 140 when the femtocell 115 is authenticated. Resources may be allocated to the secure tunnel 185 when it is established and/or dynamically during operation of the wireless communication system 100, as will be discussed herein In operation, the femtocell 115 is authenticated and registered with the SecGW 120 and the secure tunnel 185 is established through the elements of the wireline network. Tunnel information including an address of the secure tunnel 185, such as an Internet protocol address, is stored in the AAA server 125. The AAA server 125 interfaces with the HSS 140 to obtain authentication vectors to authenticate the femtocell 115 using an SWx interface between the AAA server 125 and the home subscription server 140. In the illustrated embodiment, an identifier of the femtocell 115 and tunnel information including the address of the secure tunnel 185 are sent over this interface in one or more information elements of the message that is configured according to the SWx interface definition. At this point, the femtocell 115 is configured to provide wireless connectivity to the wireless communication network over the air interface 110 using the secure tunnel 185 in the wireline communication network as a backhaul communication link.

The mobility management entity 130 monitors information transmitted from the femtocell 115 to determine when the mobile unit 105 has initiated an attach procedure to establish connectivity to the wireless communication network via the femtocell 115. When the mobility management entity 130 detects that a request from the mobile unit 105 to attach to the wireless communication network, the mobility management entity 130 retrieves the tunnel information for the secure tunnel 185 from the HSS 140. A message is then sent to the serving gateway 135. For example, the mobility management entity 130 can send a create-default-bearer message (which includes an identifier of the femtocell 115 and the tunnel information including the address of the secure tunnel 185) to the S-GW 135. Information in this message is then forwarded to the P-GW 145 over an interface such as the S5 interface when the mobile unit 105 is in its home network and the S8 interface when the mobile unit 105 is roaming. The P-GW 145 sends the femtocell identifier and the secure tunnel information to the PCRF 150. For example, the P-GW 145 may send a an IP CAN Session establishment message per 3GPP PCC specifications to the PCRF 150 over a Gx interface that includes the information elements for the femtocell identifier and the tunnel information.

Figure 2:
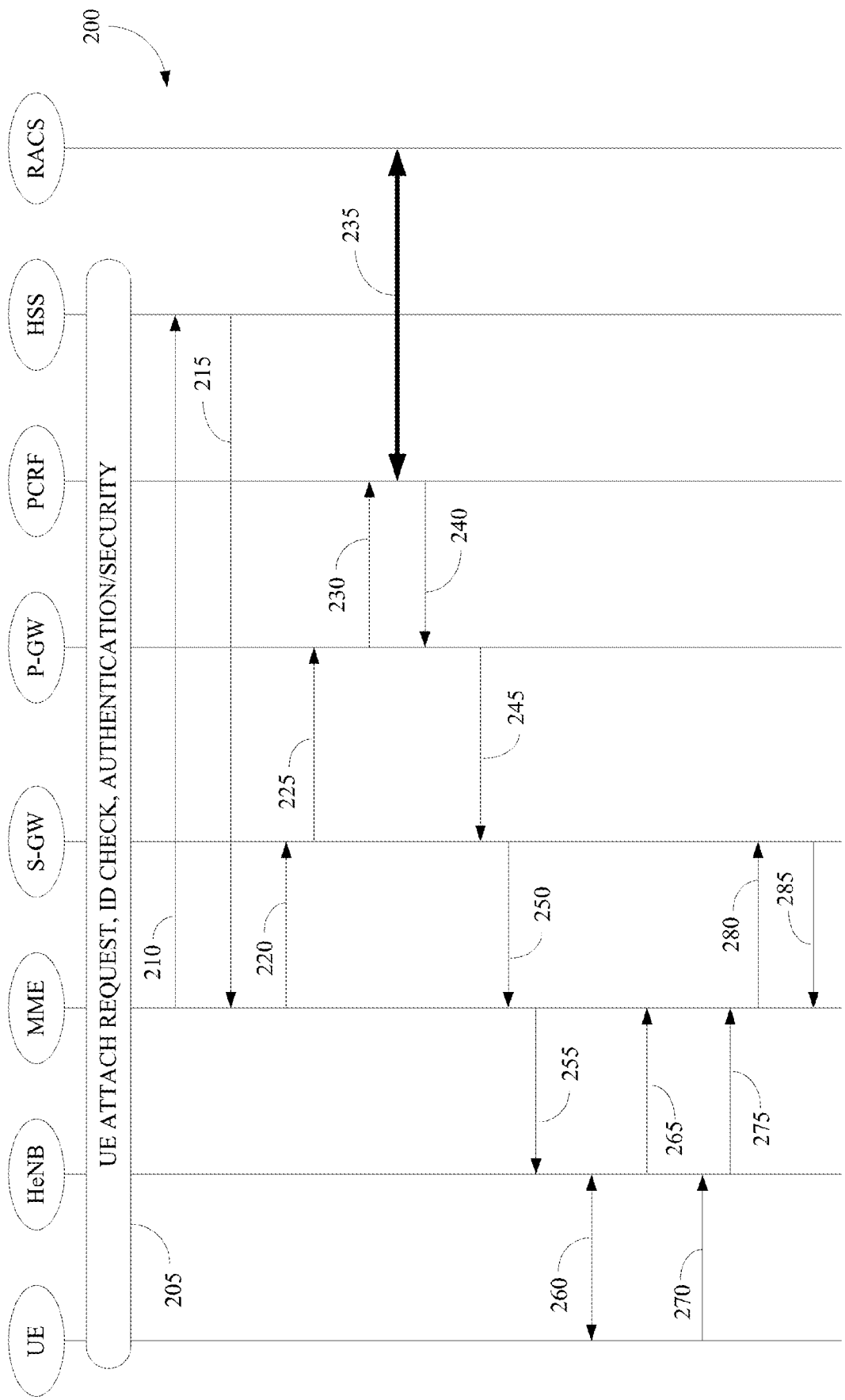
FIG. 2 conceptually illustrates one exemplary embodiment of a dedicated bearer activation procedure initiated by an attach request from user equipment.

FIG. 2 conceptually illustrates one exemplary embodiment of a default bearer activation procedure 200 initiated at user equipment attach time. In the illustrated embodiment, user equipment sends (at 205) an attach request that includes information including a packet data network type, a PCO, an APN, and the like. The network performs (at 205) an identity check of the user equipment and conventional authentication and/or security procedures are used (at 205) to authenticate and/or verify the user equipment. Once the user equipment has been authenticated and/or authorized (at 205) to request a default bearer and establish a communication session with the network, the mobility management entity (MME) sends (at 210) an update location request to the HSS. In the illustrated embodiment, the location update request includes a femtocell identifier and an information element that indicates the update type, which in this case is "attach." The HSS can then respond (at 215) with an update location acknowledgment that also includes the femtocell identifier.

The mobility management entity then requests (at 220) creation of a default bearer by transmitting a message to the serving gateway (S-GW). The create default bearer request includes the femtocell identifier. The create default bearer request is then forwarded (at 225) from the S-GW to the PDN-GW, which can then use the information to attempt to establish the requested session. In the illustrated embodiment, the PDN-GW transmits (at 230) a session establishment message, such as an IP CAN session establishment message including the femtocell identifier and: tunnel information, to the PCRF, which then performs (at 235) a femtocell quality-of-service verification process with the RACS. If the verification process is successful and the RACS confirms that sufficient wireline backhaul resources have been allocated, then the PCRF replies (at 240) with a session establishment acknowledgment including information such as an identifier of the default bearer and a femtocell quality-of service that can be supported for the requested session.

The PDN-GW transmits (at 245) a create default bearer response to the S-GW when it receives an indication that the quality-of-service authorization process has been successful and a session can be established with sufficient wireline backhaul resources. The create default bearer response is forwarded (at 250) from the S-GW to the mobility management entity. A message indicating that the initial context has been set up and that the requested attachment has been accepted is transmitted (at 255) from the MME to the femtocell/HeNB. The user equipment and the HeNB can then configure (at 260) the connection. For example, the user equipment and the HeNB may perform (at 260) a radio resource control (RRC) connection reconfiguration process. The HeNB can then transmit (at 265) a response indicating that the initial context for the requested connection has been set up. The user equipment may also send (at 270) a direct transfer to the femtocell, which triggers a response (at 275) to the mobility management entity indicating that the attach procedure is complete. The mobility management entity sends an update bearer request (at 280) to the S-GW. The update bearer request can include an identifier of the bearer, as well as the IP address of the HeNB and a tunnel identifier. The S-GW then responds (at 285) with an acknowledgment of the update bearer request.

Referring back to FIG. 1, PCRF 150 stores the femtocell identifier and the tunnel information acquired during the attach procedure. The PCRF 150 can then make policy decisions such as determining whether to admit call sessions for the attached mobile unit 105. For example, the PCRF 150 can send a QoS authorization request to the RACS 160 in the wireline network when the mobile unit 105 wants to start a QoS call session. The request may include a request for resources to support a particular QoS for communication between the mobile unit 105 and the femtocell 115. The requested resources may include bandwidth in the wireline communication network that is allocated to the tunnel 185. The RACS 160 determines the physical and logical attachment of the femtocell 115 in the wireline network, evaluates the QoS authorization request from the PCRF 150, and makes policy decisions. If the RACS 160 approves the request for tunnel resources it provisions policies, e.g. to the DSLAM 170 and the BNG 175. For example, the RACS 160 may allocate bandwidth to the secure tunnel 185 so that the femtocell 115 can use the secure tunnel 185 as a backhaul link. If not, the RACS 160 may send a counter offer to the PCRF 150 so that these entities can negotiate mutually acceptable policies. The policy rules are provisioned at the Access Node (DSLAM 170, optical access or Packet Cable CMTS) and the Broadband Network Gateway (BNG) 175.

If the wireline communication network resources are successfully allocated to support the call connection between the mobile unit 105 and the femtocell 115, then the PCRF 150 can admit the requested call to the wireless communication network. For example, the PCRF 150 can send appropriate messages to entities in the wireless communication network via the P-GW 145. The PCRF 150 may deny the requested call if it is unable to negotiate sufficient resources in the wireline communication network to support the call connection.

Figure 3:
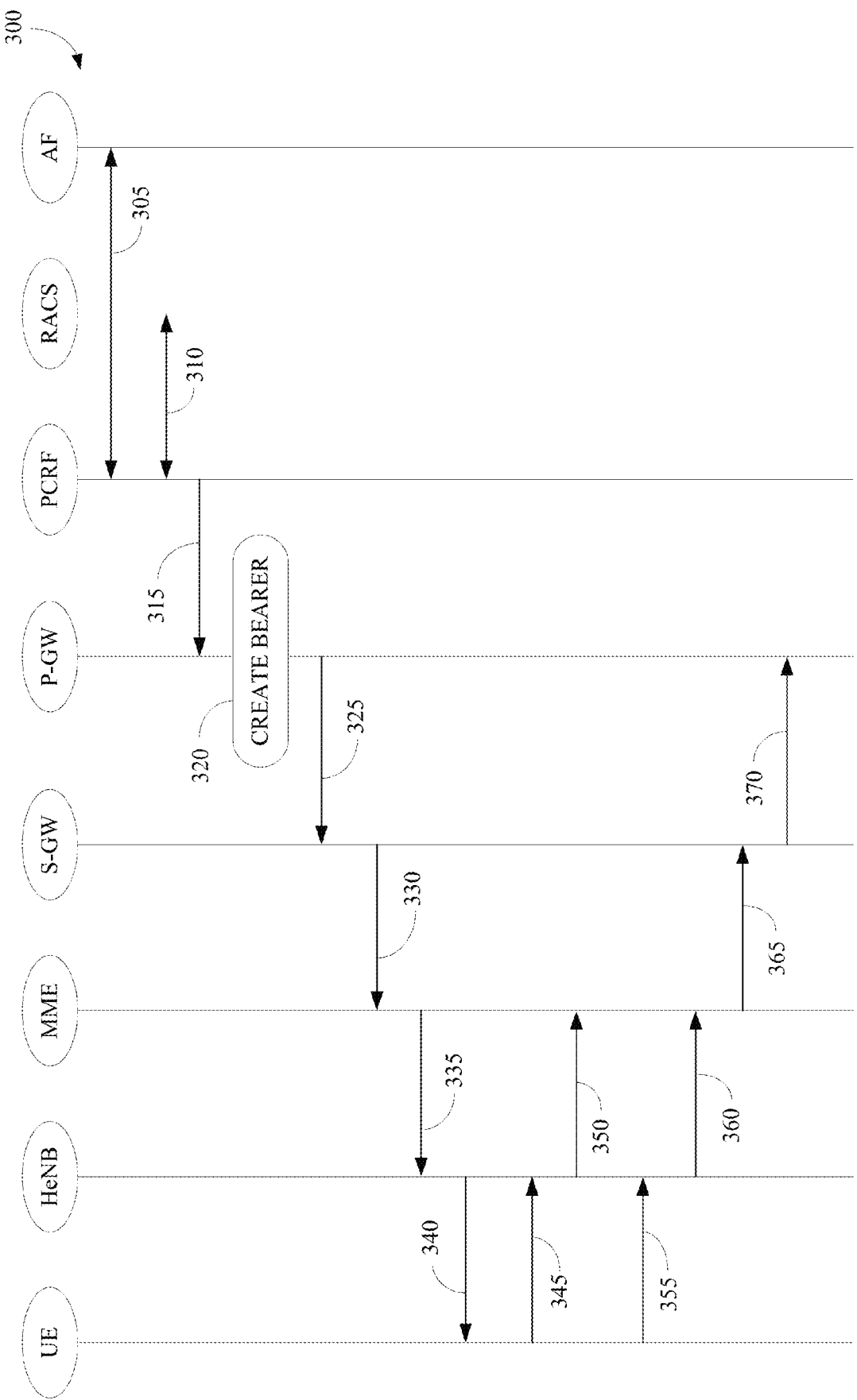
FIG. 3 conceptually illustrates a first exemplary embodiment of a method for establishing a wireless call connection using a backhaul link in a wireline communication network.

FIG. 3 conceptually illustrates a first exemplary embodiment of a method 300 for establishing a wireless call connection using a backhaul link in a wireline communication network. In the illustrated embodiment, user equipment (UE) has initiated an attach procedure with a femtocell or home e-Node B (HeNB) in its home network. A PCRF entity in the wireless communication network receives (at 305) a quality-of-service (QoS) authorization request from an application function (AF). The request includes information indicating the resources (such as bandwidth) in the wireless communication network and the wireline communication network that are required to support the requested quality-of-service. PCRF determines that the UE is connected to a HeNB based on the HeNB identity and tunnel information it stored when the UE attached in the network and resources in the wireline communication network need to be requested and/or negotiated prior to admitting the call.

The PCRF can request (at 310) resources in the wireline communication network by sending (at 310) a request to the RACS. The request includes the femtocell identity and tunnel information so that the RACS can identify the secure tunnel that is used by the femtocell. The RACS then determines whether the requested resources can be allocated to the secure tunnel. If these resources can be allocated, then the RACS sends a message indicating that resources have been allocated to the secure tunnel. Alternatively, the RACS may initiate a negotiation by transmitting a counter offer with a different resource allocation. This negotiation between the PCRF and the RACS may proceed until a mutually agreeable allocation is found. If the RACS is not able to allocate or negotiate sufficient resources, then the PCRF may elect not to admit the call because the wireline communication network would not be able to support a sufficient quality-of-service.

If the call is admitted, then the PCRF transmits (at 315) policy information to the P-GW. In one embodiment, the policy information is transmitted using an IP CAN session modification message that indicates the appropriate PCC rules, the IP address of the user equipment, and other session information. The P-GW creates (at 320) a bearer in the wireless communication system that can support the requested quality-of-service and then transmits (at 325) a request to create the dedicated bearer to the S-GW. The dedicated bearer request is forwarded (at 330) to the mobility management entity, which transmits (at 335) a request to the femtocell to set up the bearer for the requested call session. The femtocell transmits (at 340) a connection configuration message to the user equipment, e.g., using a radio resource control (RRC) connection reconfiguration message. Once the user equipment has performed the requested reconfiguration, the user equipment replies (at 345) with an acknowledgment message such as an RRC connection reconfiguration complete message. The femtocell then notifies (at 350) the mobility management entity that the bearer has been successfully set up. The user equipment may also send (at 355) a direct transfer to the femtocell, which triggers a session management response (at 360) to the mobility management entity, a dedicated bearer response (at 365) to the S-GW, and a dedicated bearer response (at 370) to the P-GW.

Figure 4:
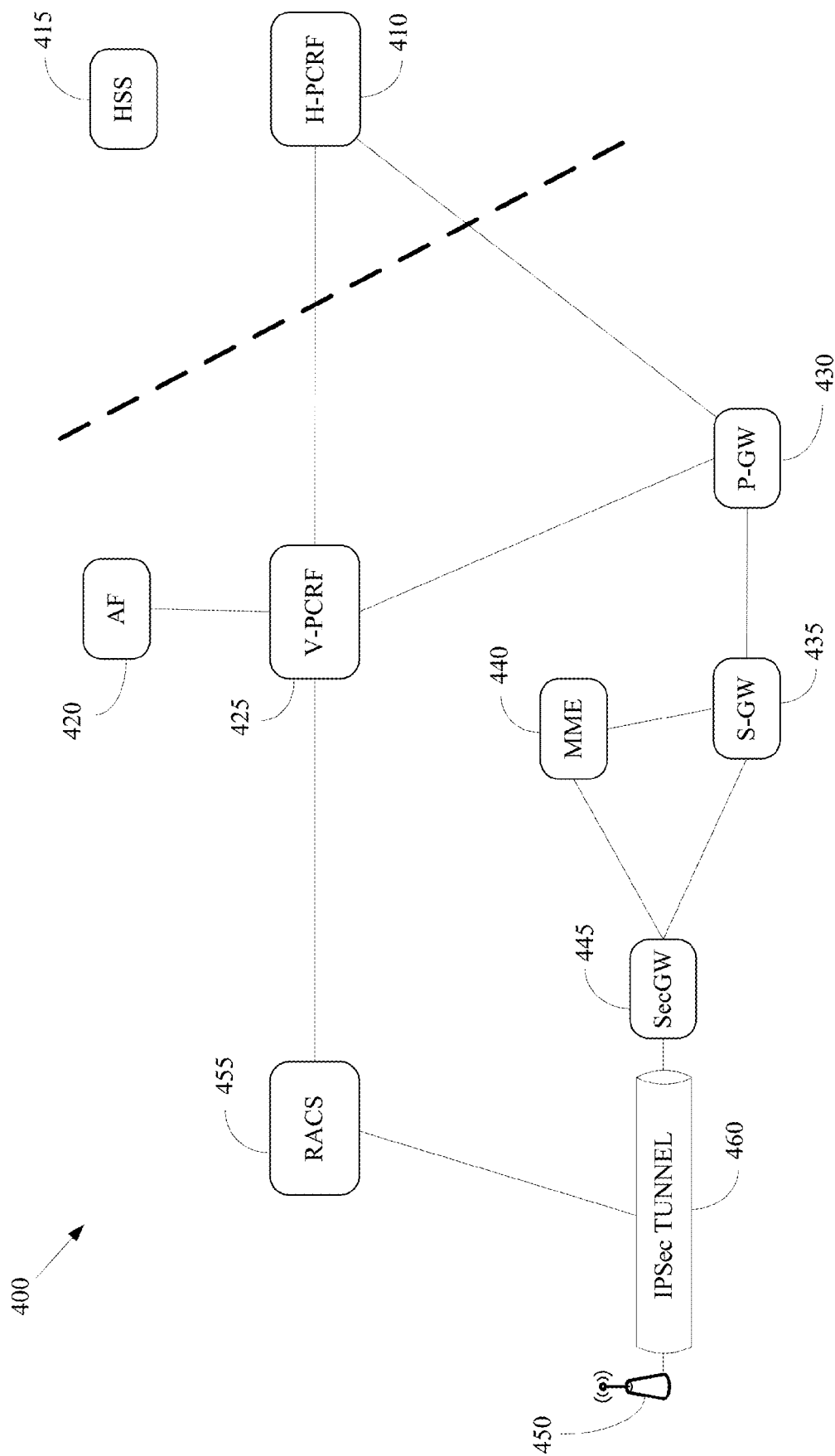
FIG. 4 conceptually illustrates a second exemplary embodiment of a communication system that includes a wireless communication network and a wireline communication network.

FIG. 4 conceptually illustrates a second exemplary embodiment of a communication system 400 that includes a wireless communication network and a wireline communication network. In the illustrated embodiment, the communication system 400 supports roaming of mobile units from a home wireless communication network to a visited wireless communication network. The home wireless communication network includes a home PCRF 410 and a home subscription server 415. The visited wireless communication network includes an application function (AF) 420, a visited PCRF 425, a P-GW 430, an S-GW 435, a mobility management entity 440, a SecGW 445, and a femtocell 450. The wireline communication network includes an RACS 455 and also supports a secure tunnel 460 that is used by the femtocell 450 as a backhaul connection to the visited wireless communication network.

As discussed in detail herein, the femtocell 450 is authenticated and registered with the SecGW 445 and the secure tunnel 460 is established through the elements of the wireline network. Tunnel information including an address of the secure tunnel 460, such as an Internet protocol address, is stored in the home wireless communication network, e.g. in an AAA server (not shown in FIG. 3), which interfaces with the HSS 415 to obtain authentication vectors to authenticate the femtocell 450. At this point, the femtocell 450 is configured to provide wireless connectivity to the wireless communication network using the secure tunnel 445 in the wireline communication network as a backhaul communication link.

The mobility management entity 440 monitors information transmitted from the femtocell 450 to determine when an attach procedure has been initiated to establish connectivity to the wireless communication network via the femtocell 450. When the mobility management entity 440 detects that a request from a roaming mobile unit to attach to the visited wireless communication network, the mobility management entity 440 retrieves the tunnel information for the secure tunnel 460 from the HSS 415, which is implemented in the home wireless communication network. A message is then sent to the serving gateway 435 and forwarded to the P-GW 430 over an S8 interface since the mobile unit is roaming. In the illustrated embodiment, the P-GW 430 sends the femtocell identifier and the secure tunnel information to the visited PCRF 425. However, in alternative embodiments for home network routed traffic, the P-GW 430 may send the femtocell identifier and the secure tunnel information to the home PCRF 410.

The visited PCRF 425 (or the home PCRF 410) stores the femtocell identifier and the tunnel information, makes policy decisions, and sends a QoS authorization request to the RACS 455 in the wireline network. For home network routed traffic, the home PCRF 410 sends the request to the RACS 455 via the visited PCRF 425. The request may include a request for resources (such as bandwidth for the secure tunnel 460) to support a particular QoS for communication between the roaming mobile unit and the femtocell 350. The RACS 455 determines the physical and logical attachment of the femtocell 450 in the wireline network, evaluates the QoS authorization request from the visited PCRF 425, and makes policy decisions. If the RACS 455 approves the request it provisions policies to the appropriate elements in the wireline communication network. If not, the RACS 455 may send a counter offer to the visited PCRF 25 so that these entities can negotiate mutually acceptable policies. If the wireline communication network resources are successfully allocated to support the call connection, then the visited PCRF 425 can admit the requested call to the visited wireless communication network. The visited PCRF 425 may deny the requested call if it is unable to negotiate sufficient resources in the wireline communication network to support the call connection.

Figure 5:
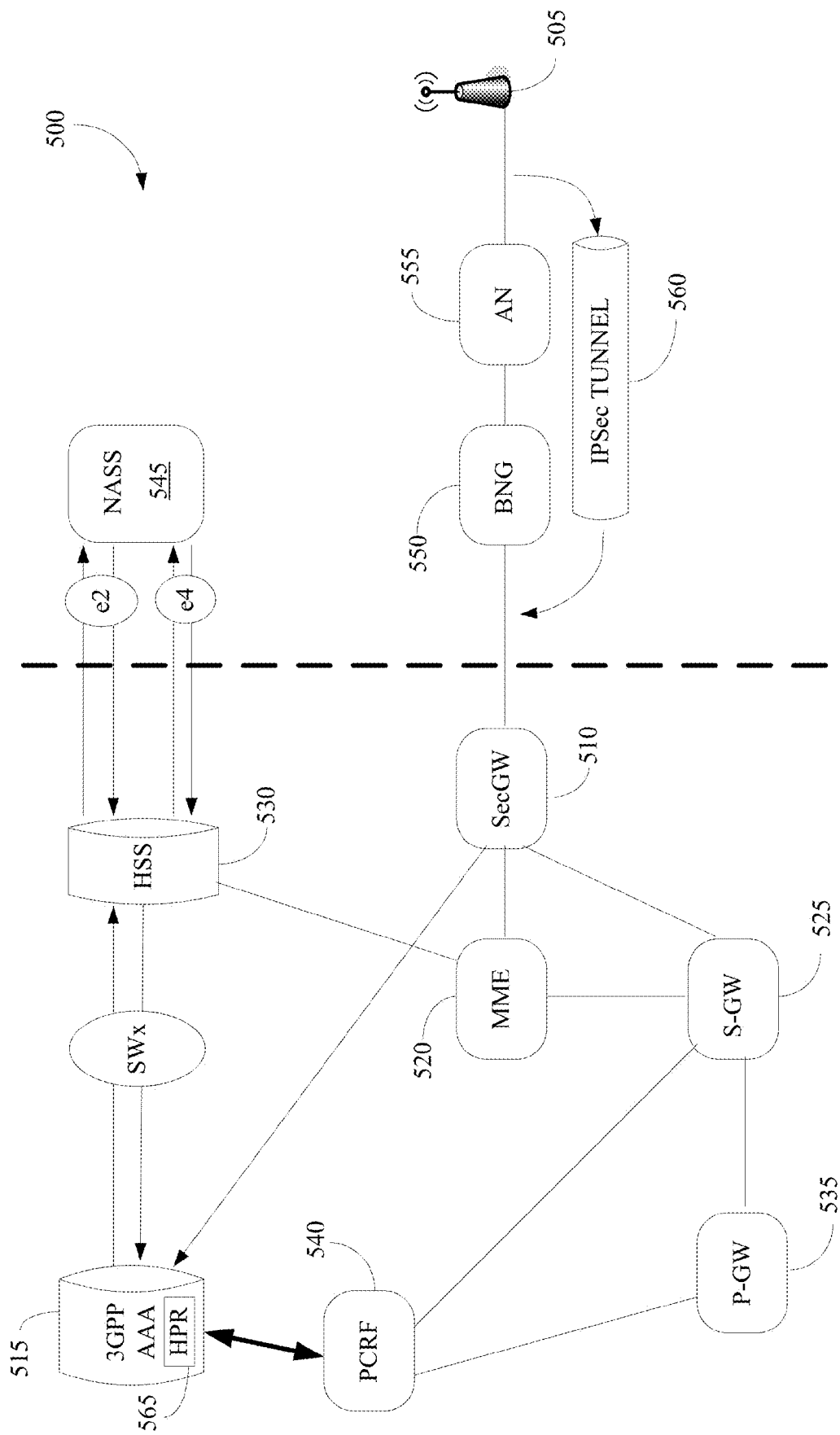
FIG. 5 conceptually illustrates a third exemplary embodiment of a communication system that includes a wireless communication network and a wireline communication network.

FIG. 5 conceptually illustrates a third exemplary embodiment of a communication system 500 that includes a wireless communication network and a wireline communication network. The entities associated with the wireless communication network shown in FIG. 5 are to the left of the boldfaced dashed line and the entities associated with the wireline communication network shown in FIG. 5 are to the right of the boldfaced dashed line, with the exception of the femtocell 505, which is associated with the wireless communication network. In the illustrated embodiment, the femtocell 505 is a home femtocell 505, which may also be referred to as a home e-node-B (HeNB), as discussed herein.

The wireless communication network includes a security gateway (SecGW) 510 that provides the initial gateway into the wireless communication network. The femtocell 505 can therefore use the security gateway (SecGW) 510 as a gateway for accessing the wireless communication network via a secure tunnel as described herein. The security gateway 510 is communicatively coupled to an authentication, authorization, and accounting (AAA) server 515, a mobility management entity ((MME) 520, and a serving gateway (S-GW) 525. These entities are also interconnected with a home subscription server ((HSS) 530 and a packet data node gateway (P-GW) 535, which is communicatively coupled to a policy and charging rules function ((PCRF) 540. The wireline communication network in the third exemplary embodiment includes a network access subsystem (NASS) 545, a broadband network gateway (BNG) 550, and an access network 555. The wireline communication network supports a backhaul communication link via a secure tunnel 560.

The third exemplary embodiment of the communication system 500 supports automatic exchange of information indicating the bandwidth allocation to the femtocell 505 between the wireline communication network and the wireless communication network. For example, this information may be negotiated and/or exchanged during a location registration of the femtocell 505 and/or during authentication of the femtocell 505. The bandwidth allocation may be automatically and/or dynamically adjusted during operation of the communication system 500. In one embodiment, the bandwidth allocation may be adjusted when the femtocell 505 requests access to the network. For example, the bandwidth allocation can be determined based upon the resources available to the access network when the location of the femtocell 505 is verified prior to granting the femtocell 505 access to the network. The PCRF 540 in the third exemplary embodiment of the communication system 500 handles virtual resource management for the backhaul resources in the wireline communication system. There may not be any interaction between the PCRF 540 and the RACS (not shown in FIG. 5) in this embodiment. The PCRF 540 may also handle quality-of-service authorization based on a subscriber profile, a time of day, whether the subscriber is roaming or not, or other criteria.

In the third exemplary embodiment, the communication system 500 supports a femtocell or HeNB Profile Repository (HPR) 565. The profile repository 565 is supported by the authentication, authorization, and accounting server 515 in the illustrated embodiment. However, persons of ordinary skill in the art having benefit of the present disclosure should appreciate that the profile repository 565 could be supported by other entities within the wireless communication network or may be implemented as a stand-alone entity that is communicatively coupled to the wireless communication network. The profile repository 550 stores profiles associated with the femtocells 505 that are supported by the communication system 500. For example, the profile repository 565 may implement a database that includes information such as the identifiers of the femtocells 505, quality-of-service profiles associated with the femtocells 505, and the like. The profiles may also include information indicating the bandwidth allocated to the femtocells 505, the type of access network (e.g., DSL, ADLS2PLUS, VDSL2, optical, and the like) being used by the femtocell 505, and other information that may be useful for admission control procedures.

In operation, the communication system 500 establishes the secure tunnel 560 through the wireline communication network when the femtocell 505 attaches to the wireless communication network. The secure tunnel 560 is supported by elements in the wireline communication network including the broadband network gateway 550 and the access network 555. As part of the establishment process, the secure gateway 510 authenticates the femtocell 505 and then sends a message to the AAA server 515 including the identifier of the femtocell 505 and tunnel information including the IP addresses that are assigned to the tunnel 560. The femtocell identifier and the tunnel information can be stored in the AAA server 515 and retrieved at a later time by the mobility management entity 520. For example, the mobility management entity 520 may retrieve this data when user equipment attach to the femtocell 505. The femtocell identifier and the tunnel information can also be transmitted to the HSS 530 as part of a location identification process for the femtocell 505.

The HSS 530 (which is in the wireless communication network) can communicate with the NASS 545 (which is in the wireline communication network) over one or more interfaces. For example, the third exemplary embodiment of the communication system 500 supports the e2 and e4 interfaces between the HSS 430 and the NASS 545. When the femtocell 505 attaches to the network 500, the HSS 530 transmits a location registration message over the e2 interface to the NASS 545 in response to receiving the femtocell identifier and the tunnel information from the AAA server 515. This message includes the identifier and the tunnel information and in response to receiving the location registration message, the NASS 545 returns location information associated with the femtocell 505. For example, the location information may include IP addresses associated with the secure tunnel 560. The HSS 530 can also transmit a request to the NASS 545 for quality-of-service information (such as a profile) associated with the femtocell 505. The profile returned by the NASS 545 can include quality-of-service information including bandwidth that has been allocated to the femtocell 505. The quality-of-service information can then be returned to the AAA server 515 for storage and future use.

Dynamic allocation and/or update of the backhaul bandwidth allocated to the femtocell 505 can be triggered by a user equipment attach procedure, a location verification message, or autonomously by the NASS 545. The allocation and/or update of the backhaul bandwidth can be performed at any interval and the intervals can be predetermined, periodic, or may be triggered in response to predetermined events. The backhaul bandwidth that is allocated to the femtocell 505 can be determined based upon SLA, resource status and/or utilization levels at entities in the system 500, time of day, and the like.

For example, when the user equipment begins an attach procedure, the mobility management entity 520 transmits the location verification message including the identity of the femtocell 505 to the HSS 530. In response to receiving this message, the HSS 530 sends a location verification message to the NASS 545, which replies with location information. The HSS 530 can also request a quality-of-service profile, which is returned by the NASS 545. In the illustrated embodiment, the returned quality-of-service profile has been updated by the NASS 545 to include updated information including an updated value of the backhaul bandwidth that has been allocated to the femtocell 505. The updated femtocell quality-of-service profile is then transmitted to the AAA server 515 and the HPR 565 for storage and subsequent use.

The mobility management entity 520 can also begin the process of creating a default bearer for the femtocell 505. Creation of the default bearer can proceed concurrently with requesting the updated femtocell quality-of-service profile. However, persons of ordinary skill in the art having benefit of the present disclosure should appreciate that the relative timing of the default bearer creation and the request for the updated profile is a matter of design choice. The mobility management entity 520 transmits a create default bearer message to the serving gateway 525 and this message includes an identifier of the femtocell 505. The serving gateway 525/and the included identifier to the P-GW 535 and the PCRF 540 so that the PCRF 540 can decide whether to authorize creation of the default bearer for the requested communication session with the femtocell 505.

The authorization process begins with the PCRF 540 requesting the quality-of-service information (including the bandwidth allocated to the femtocell and the like) from the profile repository 565. The PCRF 540 then uses this information to decide whether to admit the requested call session. For example, if sufficient backhaul bandwidth has been allocated to the secure tunnel 560 to support the requested quality-of-service, then the PCRF 540 can authorize and admit the call. For example, the PCRF 540 can send appropriate messages to entities in the wireless communication network via the P-GW 535. The PCRF 540 may deny the requested call when insufficient resources have been allocated to the tunnel in the wireline communication network to support the call connection. Since the backhaul resources have been previously allocated (either due to the initial allocation or the dynamic allocation and/or update of these resources), the PCRF 540 can perform the call admission process without communicating with the wireline network.

Figure 6:
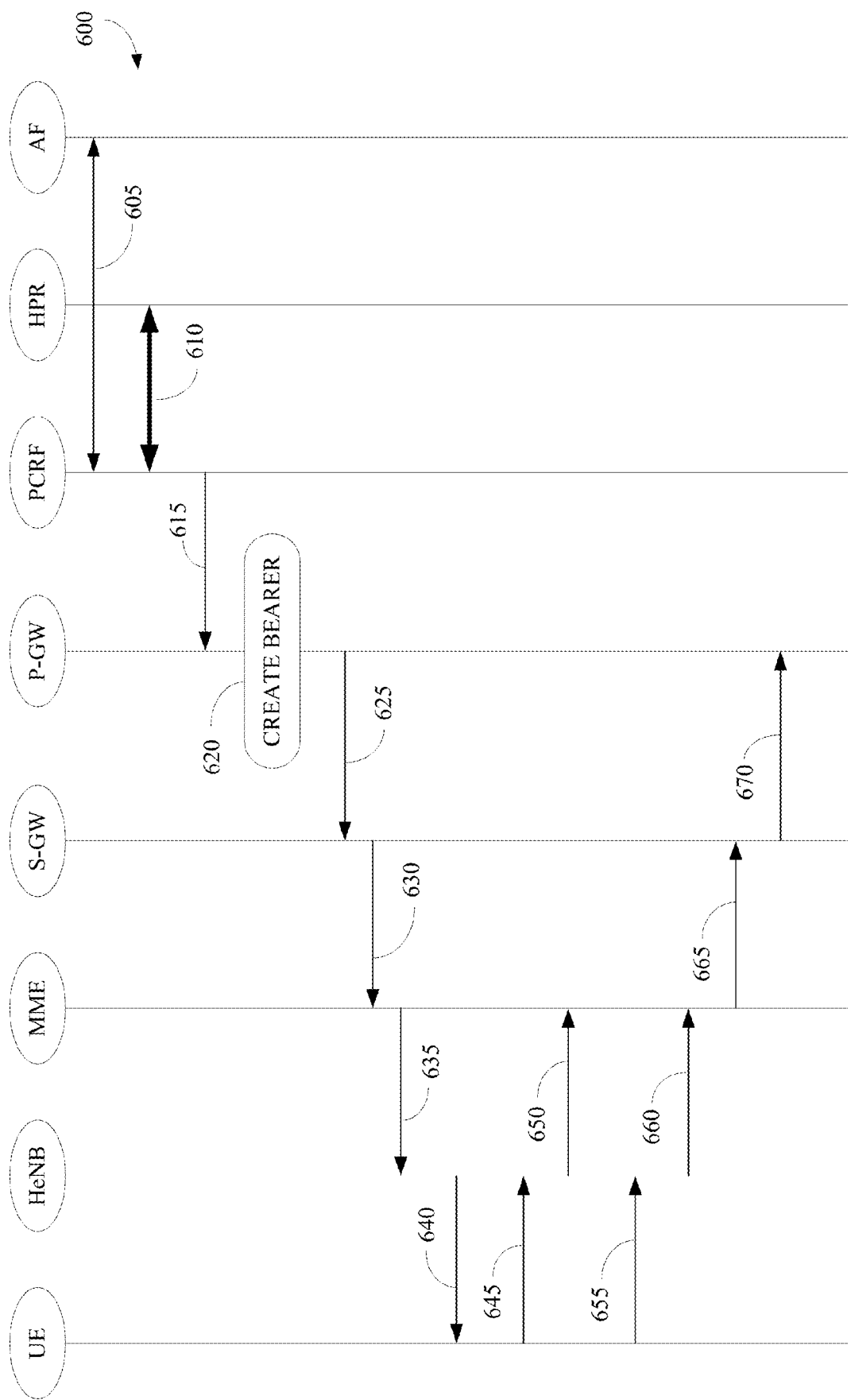
FIG. 6 conceptually illustrates a second exemplary embodiment of a method for establishing a wireless call connection using a backhaul connection in a wireline communication network.

FIG. 6 conceptually illustrates a second exemplary embodiment of a method 600 for establishing a wireless call connection using a backhaul connection in a wireline communication network. In the second exemplary embodiment, user equipment (UE) has initiated an attach procedure with a femtocell or home e-Node B (HeNB) in its home network. A PCRF entity in the wireless communication network receives (at 605) a quality-of-service (QoS) authorization request from an authentication function (AF). The QoS authorization request includes information indicating the resources (such as bandwidth) in the wireless communication network and the wireline communication network that are required to support the requested quality-of-service. Since the QoS authorization request includes a femtocell identifier and/or the secure tunnel information, the PCRF can determine that the resources in the wireline communication network need to be requested and/or negotiated prior to admitting the call.

The PCRF can request (at 610) resources in the wireline communication network by sending (at 610) a request to a home subscriber profile repository (HPR) in the wireless communication network. The request includes the tunnel information so that the HPR can identify the secure tunnel that is used by the femtocell. The HPR then determines whether the requested resources have been allocated to the secure tunnel. As discussed herein, the available resource allocations are stored in the HPR and can be dynamically allocated and/or updated using interfaces between the HSS and an NASS in the wireline communication network. If these resources have been allocated, then the HPR sends a message indicating that resources have been allocated to the secure tunnel. If sufficient resources are not available, then the PCRF may elect not to admit the call because the wireline communication network would not be able to support a sufficient quality-of-service.

If the call is admitted, then the PCRF transmits (at 615) policy information to the P-GW. In one embodiment, the policy information is transmitted using an IP CAN session modification message that indicates the appropriate PCC rules, the IP address of the user equipment, and other session information. The P-GW creates (at 620) a bearer in the wireless communication system that can support the requested quality-of-service. For example, the P-GW may create (at 620) an EPS bearer having the appropriate quality-of-service, such as QCI, ARP, GBR, and the like. The P-GW then transmits (at 625) a request to create the dedicated bearer to the S-GW. The dedicated bearer request is forwarded (at 630) to the mobility management entity, which transmits (at 635) a request to the femtocell to set up the bearer for the requested call session. The femtocell transmits (at 640) connection configuration message to the user equipment, e.g., using a radio resource control (RRC) connection reconfiguration message. Once the user equipment has performed the requested reconfiguration, the user equipment replies (at 645) with an acknowledgment message such as an RRC connection reconfiguration complete message. The femtocell then notifies (at 650) the mobility management entity that the bearer has been successfully set up. The user equipment may also send (at 655) a direct transfer to the femtocell, which triggers a session management response (at 660) to the mobility management entity, a dedicated bearer response (at 665) to the S-GW, and a dedicated bearer response (at 670) to the P-GW.

Figure 7:
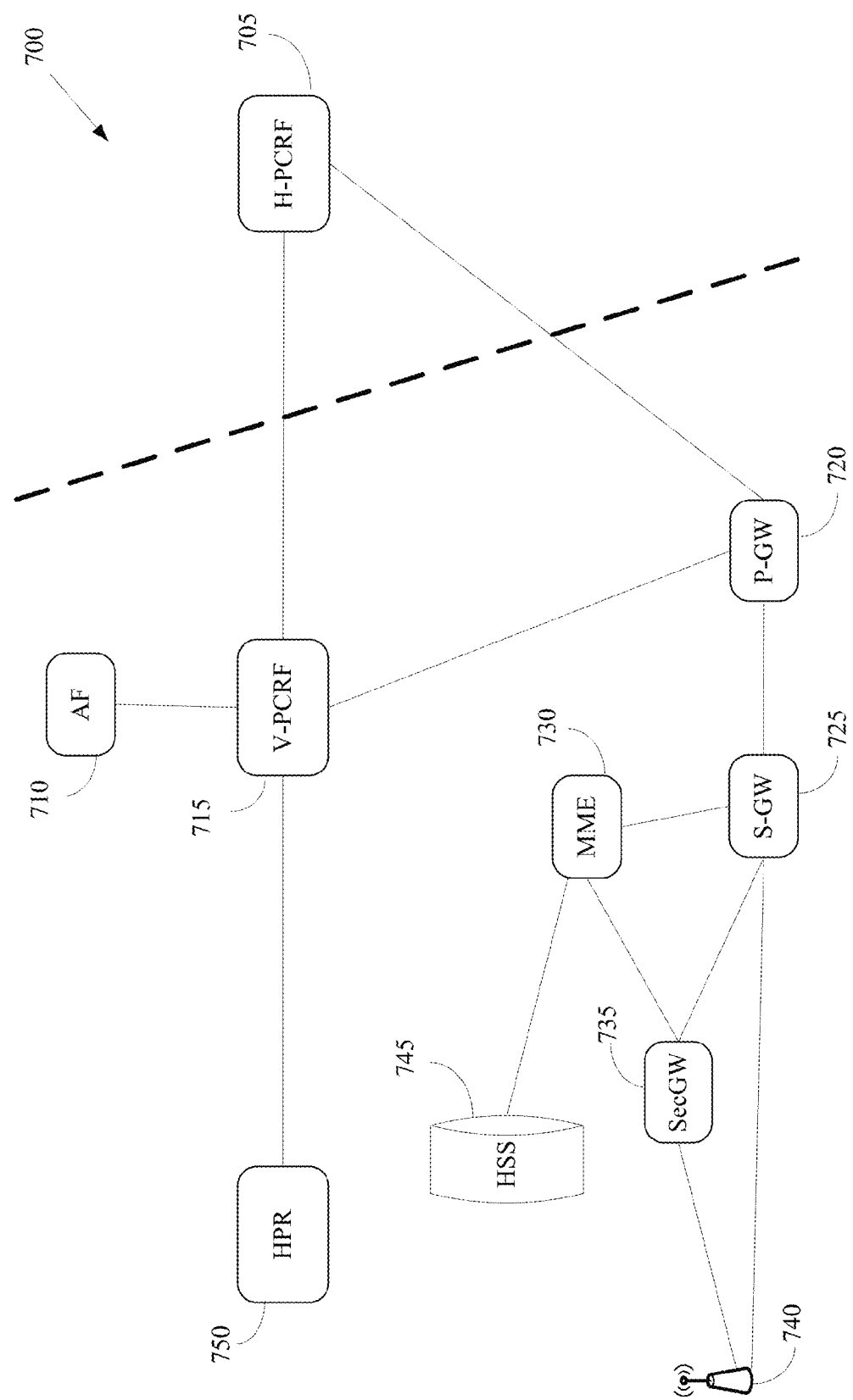
FIG. 7 conceptually illustrates a third exemplary embodiment of a communication system that includes a wireless communication network and a wireline communication network.

FIG. 7 conceptually illustrates a fourth exemplary embodiment of a communication system 700 that includes a wireless communication network and a wireline communication network. In the illustrated embodiment, the communication system 700 supports roaming of mobile units from a home wireless communication network to a visited wireless communication network. The home wireless communication network includes a home PCRF 705. The visited wireless communication network includes an authentication function (AF) 710, a visited PCRF 715, a P-GW 720, an S-GW 725, a mobility management entity 730, a SecGW 735, and a femtocell 740. The wireless communication network includes an HSS 745 and an HPR 750 that can store information associated with the femtocell 740, such as resources that have been allocated for a backhaul connection to the visited wireless communication network.

As discussed in detail herein, the femtocell 740 is authenticated and registered with the SecGW 735 and a secure tunnel is established through the elements of the wireline network. Tunnel information including an address of the secure tunnel, such as an Internet protocol address, is stored in the home wireless communication network, e.g. in a AAA server (not shown in FIG. 7), which interfaces with the HSS 745 to obtain authentication vectors to authenticate the femtocell 740. At this point, the femtocell 740 is configured to provide wireless connectivity to the wireless communication network using the secure tunnel in the wireline communication network as a backhaul communication link. Elements in the wireline communication network and the wireless communication network can communicate to establish and/or negotiate a resource allocation that can be used for the backhaul links through the secure tunnel. The resource allocation can be communicated to the wireless communication network and stored in the HPR 750, as discussed herein.

The mobility management entity 730 monitors information transmitted from the femtocell 740 to determine when an attach procedure has been initiated to establish connectivity to the wireless communication network via the femtocell 740. When the mobility management entity 730 detects that a request from a roaming mobile unit to attach to the visited wireless communication network, the mobility management entity 730 retrieves the tunnel information for the secure tunnel from the HSS 745 which is implemented in the visited wireless communication network. A message is then sent to the serving gateway 725 and forwarded to the P-GW 720 over an S8 interface since the mobile unit is roaming. In the illustrated embodiment, the P-GW 720 sends the femtocell identifier and the secure tunnel information to the visited PCRF 715. However, in alternative embodiments, the P-GW 720 may send the femtocell identifier and the secure tunnel information to the home PCRF 705.

The visited PCRF 715 receives a QoS authorization request from the AF 710 and sends a request for backhaul resources to the HPR 750. The backhaul resource request includes an identifier of the femtocell 740. In one embodiment, the request from the AF may include a request for resources (such as bandwidth for the secure tunnel) to support a particular QoS for communication between the roaming mobile unit and the femtocell 740. The visited PCRF 715 may also request PCC rules associated with the requested default bearer from the home PCRF 705, which may provide the requested rules using information stored locally or in some other entity that is communicatively coupled to the home PCRF 705.

The visited PCRF 715 obtains the available bandwidth from the HPR 740 and makes policy decisions such as call admission decisions based on the bandwidth available to the femtocell. The visited PCRF 715 may deny the requested call if the available bandwidth is insufficient or may take other factors into consideration such as time of the day, roaming vs. non-roaming subscriber, and the like.

Implementing the automatic/dynamic allocation and/or modification of the bandwidth allocated to the backhaul connection used by the wireless communication network has a number of advantages. For example, the bandwidth allocation information may be automatically exchanged between the wireline and the wireless domains when the femtocell or HeNB powers up and/or is authenticated by the network. The bandwidth allocation may also be adjusted based on the fixed access network resource availability when location verification is performed for the femtocell or HeNB. The PCRF can then handle the admission control without requiring a per user equipment session interface between elements in the wireless and wireline domains such as the PCRF and the RACS, respectively.

The techniques for verifying the availability of wireline backhaul resources before admitting a wireless call also have a number of advantages. For example, allocation of resources to the wireline backhaul connection and determination of resource availability in the wireline access network to support a new/modified H(e)NB service flow is performed before the new/modified flow is admitted in the wireless network. For another example, QoS negotiations between the wireless and wireline servers can be performed prior to admitting the new/modified flow so that the flow is only admitted when the required resources are available. In embodiments of the techniques described herein, the PCRF is given the ability to decide how HeNB resources are allocated which can improve the efficiency of utilization of bandwidth resources that are allocated to the HeNB. Embodiments of the techniques described herein also allow the QoS in the wireline access network to be verified and thus the system provides a better user experience. The signaling load in the network can be reduced and the techniques described herein work with and without policy servers deployed in the wireline access network. Furthermore, the same PCC/PCRF architecture can be used by users connected to HeNBs and (macro) eNBs Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A call admission control method for use in a wireless communication network that includes a femtocell that is coupled to the wireless communication network via a wireline communication network, comprising:

receiving, at a first call admission controller in the wireless communication network, a request to initiate a call between user equipment and the femtocell using a secure tunnel between the femtocell and the wireless communication network;

transmitting a request for resources from the first call admission controller to a second call admission controller in the wireline communication network, the request for resources including the address of the secure tunnel, wherein the second call admission controller uses the address to determine whether sufficient resources are available to support a selected quality-of-service for the call via the secure tunnel; and admitting, at the first call admission controller, the call in response to receiving confirmation from the second call admission controller that sufficient resources are available to the secure tunnel.

2. The call admission control method set forth in claim 1, wherein receiving the request to initiate the call comprises receiving a session establishment message comprising the address of the secure tunnel and an identifier of the femtocell.

3. The call admission control method set forth in claim 2, wherein transmitting the request comprises sending a quality-of-service authorization request comprising a request to allocate bandwidth to the secure tunnel sufficient to support the selected quality-of-service.

4. The call admission control method set forth in claim 3, wherein requesting the resources in the wireline communication network comprises:

receiving confirmation from the second call admission controller that the requested resources are available to the secure tunnel, wherein the second admission controller generates the confirmation in response to determining a physical or logical attachment of the femtocell in the wireline communication network and evaluating the quality-of-service authorization request on the basis of this information.

5. The call admission control method set forth in claim 4, comprising negotiating, between the first and second call admission controllers, resources for the secure tunnel when the requested resources are not available.

6. The call admission control method set forth in claim 4, wherein transmitting the request for resources in the wireline communication network comprises requesting the resources in the wireline communication network prior to admitting the call.

7. The call admission control method set forth in claim 4, comprising:

determining whether there are sufficient resources available in the wireless communication network to support the selected quality-of-service; and admitting the requested call when there are sufficient resources available in both the wireless communication network and the wireline communication network to support the call at the selected quality-of-service.

8. The call admission control method set forth in claim 7, wherein admitting the requested call comprises configuring a bearer for the call based on the resources available in the wireless communication network and the wireline communication network, the bearer utilizing the secure tunnel.

9. The call admission control method set forth in claim 8, wherein configuring the bearer comprises configuring the bearer concurrently with the call admission controller in the wireline communication network configuring the secure tunnel based on the resources available to the secure tunnel in the wireline communication network.

10. A call admission control method for use in a wireless communication network that includes a femtocell that is coupled to the wireless communication network via a wireline communication network, comprising:

receiving, at a first call admission controller in the wireline communication network and from a second call admission controller in the wireless communication network, a request to allocate resources of the wireline communication network to a call at a selected quality-of-service between user equipment and the femtocell using a secure tunnel between the femtocell and the wireless communication network, the request comprising the address of the secure tunnel;

determining, at the first call admission controller using the address, whether the requested resources are available to support the secure tunnel; and transmitting, from the call admission controller in the wireline communication network to the call admission control in the wireless communication network, information indicating whether the requested resources are available to support the secure tunnel in the wireline communication network.

11. The call admission control method set forth in claim 10, wherein receiving the request to allocate the resources comprises receiving a quality-of-service authorization request comprising the address of the secure tunnel, wherein the quality-of-service authorization request further comprises a request to allocate bandwidth to the secure tunnel sufficient to support the selected quality-of-service.

12. The call admission control method set forth in claim 11, wherein determining whether the requested resources are available comprises determining whether resources sufficient to support a selected quality-of-service for the call are available in the wireline communication network.

13. The call admission control method set forth in claim 12, wherein requesting the resources in the wireline communication network comprises transmitting a confirmation, from the first call admission controller to the second call admission controller, when the requested resources are available to the secure tunnel.

14. The call admission control method set forth in claim 12, comprising negotiating, between the first and second call admission controllers, resources for the secure tunnel when the requested resources are not available to the secure tunnel.

15. The call admission control method set forth in claim 12, wherein receiving the request for the resources in the wireline communication network comprises receiving the request for the resources in the wireline communication network prior to the second call admission controller admitting the call.

16. The call admission control method set forth in claim 12, comprising receiving a message indicating that the second, call admission controller has admitted the requested call when there are sufficient resources available in both the wireless communication network and the wireline communication network to support the call at the selected quality-of-service.

17. The call admission control method set forth in claim 16, wherein receiving the message indicating that the requested call has been admitted includes receiving information indicative of a bearer that has been established for the call based on the resources available in the wireless communication network and the wireline communication network, the bearer utilizing the secure tunnel.

18. The call admission control method set forth in claim 17, comprising configuring the secure tunnel based on the resources available to the secure tunnel in the wireline communication network, said configuration occurring concurrently with the second call admission controller configuring the bearer.

19. The call admission control method set forth in claim 17, wherein configuring the secure tunnel comprises transmitting policies from the first call admission controller to one or more entities in the wireline communication networks that support the secure tunnel.

20. The call admission control method set forth in claim 10, comprising determining a physical or logical attachment of the femtocell in the wireline communication network based on the address and evaluating the quality-of-service authorization request on the basis of the physical or logical attachment of the femtocell in the wireline communication network.

* * * * *

UNITED STATES PATENT AND TRADEMARK OFFICE
CERTIFICATE OF CORRECTION

| | | |
|---|---|---|
| PATENT NO. | : 8,498,651 B2 | Page 1 of 1 |
| APPLICATION NO. | : 12/613578 | |
| DATED | : July 30, 2013 | |
| INVENTOR(S) | : Konstantin Livanos | |

It is certified that error appears in the above-identified patent and that said Letters Patent is hereby corrected as shown below:

In the Claims

Column 17, Line 27, please change "wherein the second admission controller generates the confirmation in response to determining a physical or logical attachment of the femtocell in the wireline communication network and evaluating the quality-of-service authorization request on the basis of this information." to -- wherein the second call admission controller generates the confirmation in response to determining a physical or logical attachment of the femtocell in the wireline communication network and evaluating the quality-of-service authorization request on the basis of this information. --

Column 18, Line 47, please change "comprising receiving a message indicating that the second, call admission controller has admitted the requested call when there are sufficient resources available in both the wireless communication network and the wireline communication network to support the call at the selected quality-of-service." to -- comprising receiving a message indicating that the second call admission controller has admitted the requested call when there are sufficient resources available in both the wireless communication network and the wireline communication network to support the call at the selected quality-of-service. --

Signed and Sealed this
Twenty-ninth Day of April, 2014

Michelle K. Lee
*Deputy Director of the United States Patent and Trademark Office*